United States Patent
Li

(10) Patent No.: US 6,546,549 B2
(45) Date of Patent: *Apr. 8, 2003

(54) SOURCE CODE TRANSFORMATION PROCESS AND RECORDING MEDIUM

(75) Inventor: Qiaoyun Li, Saitama (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,488

(22) Filed: Aug. 19, 1998

(65) Prior Publication Data

US 2002/0013936 A1 Jan. 31, 2002

(30) Foreign Application Priority Data

Aug. 21, 1997 (JP) .............................. 9-225239

(51) Int. Cl.⁷ ................................................ G06F 9/45
(52) U.S. Cl. ...................... 717/137; 717/108; 717/116; 717/136; 717/140; 717/147; 717/148
(58) Field of Search ................................ 717/136, 137, 717/108, 176, 116, 140, 147–148

(56) References Cited

U.S. PATENT DOCUMENTS 5,999,988 A * 12/1999 Pelegri-Llopart et al. ... 709/304
6,058,431 A * 5/2000 Srisuresh et al. ........... 709/245
6,157,961 A * 12/2000 Kessler et al. .............. 709/315
6,347,342 B1 * 2/2002 Marcos et al. .............. 709/315
6,453,362 B1 * 9/2002 Bittinger et al. ............ 709/316

OTHER PUBLICATIONS

Stoyenko, "SUPRA–RPC: SUbprogram PaRAmeters in Remote Procedure Calls", IEEE, pp. 620–627, Dec. 1991.*
Bacon et al., "Using Events to Build Distributed Application", IEEE, pp. 148–155, Jun. 1995.*
Schmidt, "Evaluating Architectures For Multithreaded Object Request Brokers", ACM, pp. 54–60, Oct. 1998.*
OMG Document, "The Common Object Request Broker: Architecture and Specification", Digital Equipment Co., Hewlett–Packard Co., HyperDesk Co., NCR Co., Object Design, Inc., SunSoft, Inc. pp 1–178, Dec. 1993.*

* cited by examiner

*Primary Examiner*—Gregory Morse
*Assistant Examiner*—Ted T. Vo
(74) *Attorney, Agent, or Firm*—Frommer Lawrence & Haug LLP; William S. Frommer; Glenn F. Savit

(57) ABSTRACT

A process for transforming an original source code containing a description of a stub method employed in an object interaction into another source code corresponding to an environment on which a program is executed. The original source code is described with a predetermined programming language and contains information concerning the stub method to be used in the object interaction. The information is described in a format which is common to a plurality of different program execution environments. The transformation is conducted with reference to a registered information corresponding to the program execution environment on which stub method is to be executed into another source code described with the same programming language as the original source code in a predetermined format corresponding to the program execution environment on which the stub method is to be executed.

12 Claims, 4 Drawing Sheets

US 6,546,549 B2

SOURCE CODE TRANSFORMATION PROCESS AND RECORDING MEDIUM

BACKGROUND OF THE INVENTION

1. Field of the Invention

The present invention relates to a source code transformation process for transforming source code including a description concerning an object interaction method known as a stub method into source code which is adapted to a program execution environment. The present invention also is concerned with a computer-readable recording medium which stores a source code transformation program for implementing the source code transformation process. Details of certain features of the present invention are described in European Patent Application No. 0.753,811 A1 entitled "Data processing method and device" and filed by the same assignee on Jul. 12, 1996 claiming a Convention Priority on JP 178625/95, filed Jul. 14, 1997, the complete disclosure of which is hereby incorporated herein by reference.

2. Description of the Related Art

In general, object-oriented programming frequently uses object interaction methods. The term "object interaction" is used in this specification to mean, for example, a process for sending a message from one object to another. The object interaction is an essential service offered by an operating system in object-oriented programming.

Methods employed in object interaction are generally referred to as "stub methods". Thus, a stub method is used in object-oriented programming for the purpose of sending a message from one object to another. In the following description, the object from which the message is sent will be referred to as a "client object", while the object which receives the message will be referred to as a "server object".

For instance, when it is desired to execute the procedure of a server object on another computer linked through a network, a message is sent through the network from the client object to the server object to be executed on the other computer. It is thus possible to execute the procedure of the server object on the other computer linked through the network. It will be understood that a remote control operation for calling a procedure to be executed on a different computer through a network can be performed in the same way as that performed by a local procedure call interface.

In general, a stub generator is used for generating a stub method. More specifically, such a stub generator reads source code containing information concerning a stub method described in a certain programming language and generates a stub method from the read source code. In most cases, the stub generator has both a function for generating a stub method concerning the client object which is the message sender and a function for generating a stub method concerning the server object which is the message receiver. With these functions, the client object and the server object can be set up very easily with a high degree of versatility.

A description will be given of a process for forming a program by using a stub generator.

Formation of the program using a stub generator includes describing a program for a non-object-interaction portion by means of the C++ programming language and describing a program for an object-interaction portion by using an interface definition language. The "interface definition language" is a language which defines the interface for the communication between the objects. The interface definition language may be, for example, a language determined by the CORBA (Common Object Request Broker Architecture) which is a rule for implementing object-oriented distributed processing environments.

More specifically, referring to FIG. 4, the process of forming an application program for object interaction begins with the formation of three kinds of source codes which are referred to as the "first, "second" and "third" source codes.

The first source code contains stub method information described in the interface definition language. This means that the interface to be used for the object interaction is defined by the first source code. In FIG. 4, a file f1 in which the first source code is written is indicated as "Test.idl".

The second source code contains server object information described in a programming language such as C++. Thus, the second source code contains the portion of the server object information other than the object interaction information described in the first source code. The second source code further contains, for example, a procedure for calling, from the stub method described by the first source code, a method for generating a thread which performs processing based on the received message. In FIG. 4, a file f2 describing the second source code is represented by "Test svc_proc.cc".

The third source code contains the client object information described in a programming language such as C++. It is to be noted that the third source code includes the portion of the client object information other than the object interaction information described in the first source code. Thus, the third code contains a description for implementing a main function, e.g., connection to an appropriate service, in the form of an application program. In FIG. 4, a file f3 in which the third code is described is represented by "Test.cc" and "Test.h". The "Test.h" file is an include file which is incorporated in the "Test.cc" file.

The first source code described in the interface definition language is transformed by a stub generator 101 into source code described with the same programming language as that used for the description of the second and third source codes. Thus, the stub generator 101 generates a stub method which is described by a programming language such as C++ rather than by the interface definition language.

More specifically, the transformation performed by the stub generator 101 generates from the file f1 in which the first code is described, a file f4 which contains a stub method description for the server object, a file f5 containing a stub method description for the client object, and an include file f6 which is to be commonly used by objects involved in the object interaction.

In FIG. 4, the file f4 containing the stub method description for the server object is represented by "TestStub.cc" and "TestStub.h". The "TestStub.h" file is an include file incorporated in the "TestStub.cc" file. The file f5 containing stub method description for the client object is represented by "TestProxy.cc" and "TestProxy.h". The "TestProxy.h" file is an include file incorporated in the "TestProxy.cc" file. The include file f6 commonly used by the objects involved in the object interaction is represented by "TestEntry.h" and "Test-Msg.h".

Then, compilation is performed on each of the file f2 containing the description of the second source code, the file f3 containing the description of the third source code, and the files f4 to f6 generated by the stub generator 101, and the results of the compilation are linked, thereby forming a server object executable file f7 for the server object and a client object executable file f8

Thus, in the process shown in FIG. 4, the server object executable file f7 is generated by an executable file generating program 102 having a compiler and a linker from the resources which include the file f2 (Test_svc_proc.cc) describing the second source code, the file f4 (TestStub.cc, TestStub.h) containing the stub method description for the server object, and the include file f6 (TestEntry.h, TestMsg.h). which is commonly used by the objects taking part in the object interaction. At the same time, the client object executable file f8 is generated by an executable file generating program 103 having a compiler and a linker from the resources which include the file f3 (Test.h, Test.cc) describing the third source code, the file f5 (TestProxy.cc, TestProxy.h) containing the stub method description for the client object, and the include file f6 (TestEntry.h, TestMsg.h). which is commonly used by the objects taking part in the object interaction.

In general, there are a variety of environments under which programs are executed. Any application program, therefore, has to be formed so as to be suited to the program execution environment. This naturally requires that the program execution environment is suited also to the stub method which is generated in accordance with the nature of the application program and the demand. The stub generator, therefore, has to generate the stub method such that the stub method is suited to the execution environment of the application program that relies upon the generated stub method.

Therefore, it has been a conventional practice to prepare different stub generators which generate stub methods for different program execution environments. Thus, generation of a specific stub method requires selective use of the stub generator in accordance with the environment in which the application program which uses the stub method is to be executed.

Thus, the conventional technique for generating a stub method employs an operation performed by a stub generator for transforming source code described in an interface definition language. The following problems are encountered by this known technique.

Firstly, studying and learning interface definition languages are essential in order for the programmer to form an application program which uses a stub method, because the formation of source code described in a certain interface definition language is necessary. In general, interface definition languages and programming languages such as C++ have fundamentally different formats. Thus, an ordinary programmer, even if familiar with programming languages, has to spend much time studying and learning interface definition languages to such a degree as to become able to form a source code with an interface definition language. Consequently, much time and labor are necessary for forming an application program which uses a stub method.

A second problem pertains to the difficulty that lies in ascertaining matching between the interface constituted by the source code portion described in the interface definition language and the interface corresponding to the source code portion described in a programming language such as C++. This difficulty will be described in detail. A single application program formed by the procedure shown in FIG. 4 contains both a portion described in the interface definition language and a portion described in the programming language such as C++. As stated before, these two types of languages employ entirely different formats. Therefore, co-existence of a description in the interface definition language and a description in the programming language such as C++ makes it extremely difficult to confirm whether or not the interfaces of these descriptions match with each other.

A third problem is that the conventional stub generator cannot be used commonly for a plurality of different program execution environments. Therefore, as stated before, is has been necessary to prepare a plurality of stub generators which generate different stub methods suited to different program execution environments.

Fourthly, it is to be pointed out that only methods which have been determined by the interface definition languages are usable as the stub method. Thus, the users are not allowed to interactively change the contents of the stub method. In other words, the stub methods are determined in the procedure for designing the stub generators and, hence, are dependent on the stub generators. The contents of the stub methods therefore cannot be altered by users.

SUMMARY OF THE INVENTION

Accordingly, it is an object of the present invention to provide a source code transformation process which can easily be adapted to a variety of program execution environments and which can generate stub methods without using any interface definition language.

Another object of the present invention is to provide a computer-readable recording medium storing a source transformation program which implements the above-described source code transformation process.

To these ends, according to one aspect of the present invention, there is provided a source code transformation process, comprising the steps of: preparing a primary source code described with a predetermined programming language and containing information concerning a method to be used in an object interaction, the information being described in a format which is common to a plurality of different program execution environments; and transforming, by making a reference to registered information corresponding to the program execution environment on which the method is to be executed, the primary source code into a secondary source code described with the same programming language as the primary source code in a predetermined format corresponding to the program execution environment on which the method is to be executed.

According to another aspect of the present invention, there is provided a computer-readable recording medium, storing a source code transformation program that implements a process comprising the steps of: preparing a primary source code described with a predetermined programming language and containing information concerning a method to be used in an object interaction, the information being described in a format which is common to a plurality of different program execution environments; and transforming, by making a reference to registered information corresponding to the program execution environment on which the method is to be executed, the primary source code into a secondary source code described with the same programming language as the primary source code in a predetermined format corresponding to the program execution environment on which the method is to be executed.

These and other objects, features and advantages of the present invention will become clear from the following description of the preferred embodiment taken with reference to the accompanying drawings.

DESCRIPTION OF THE PREFERRED EMBODIMENT

A source transformation process in accordance with the present invention will be described through illustration of a procedure for forming an application program which implements object interaction between a client object and a server object. The recording medium in accordance with the present invention stores a program which implements a stub generator described later. The term "recording medium" is used to mean any type of computer-readable storage medium such as, for example, a magnetic disk, a magneto-optical disk, a phase-change optical disk, an optical disk, a ROM (Read Only Memory), a RAM (Random Access Memory), and so on.

Figure 1:
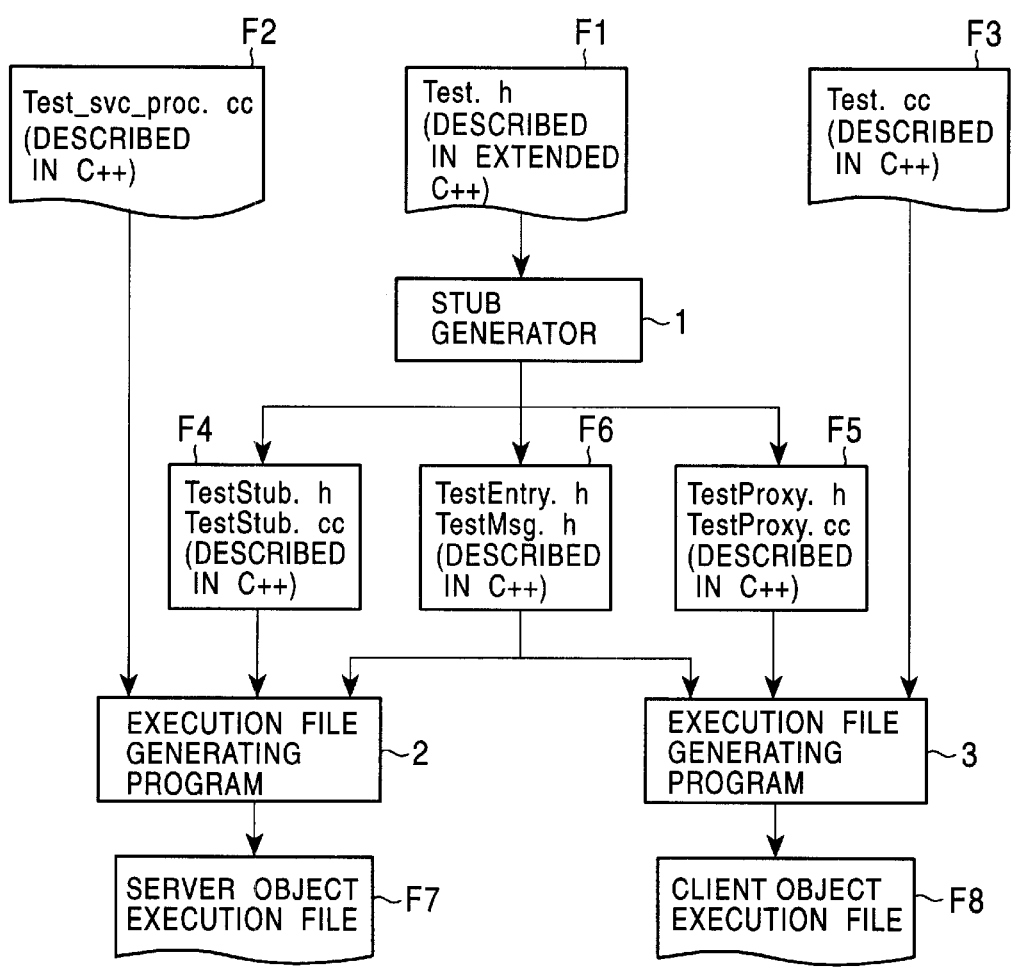
FIG. 1 is an illustration of a procedure for forming a stub method by means of a stub generator incorporating the present invention.

Referring to FIG. 1, the process of forming an application program for object interaction begins with formation of three kinds of source codes which are referred to as the "first, "second" and "third" source codes.

The first source code contains a stub method description. This means that the interface to be used for the object interaction is defined by this first source code. The first source code is described with C++ extended to allow the use of a predetermined designator "Active" which is intended to enable the description concerning the stub method. The designator "Active" has been defined by an extension of C++ specifically for the purpose of carrying out the present invention. A member function designated as "Active" is the member function corresponding to the stub method. In FIG. 1, a file F1 in which the first source code is described is represented by "Test.h".

The second source code contains server object information described in C++. The second source code contains the portion of the server object information other than the object interaction information described in the first source code. The second source code further contains, for example, a procedure for calling, from the stub method described by the first source code, a method for generating a thread which performs a processing based on a received message. In FIG. 1, a file F2 describing the second source code is represented by "Test_svc_proc.cc".

The third source code contains client object information described in C++. It is to be noted that the third source code includes the portion of the client object information other than the object interaction information described in the first source code. Thus, the third code contains a description for implementing a main function, e.g., connection to an appropriate service, in the form of an application program. In FIG. 1, a file F3 in which the third code is described is represented by "Test.cc".

The first source code is transformed by a stub generator 1 into a source code described with C++ without the use of the above-mentioned designator "Active". In other words, the stub generator 1 transforms the source code, such that the member function designated by the designator "Active" is described with C++ that has not been extended to enable the use of the designator "Active". Consequently, a stub method is generated which is described in the same programming language, i.e., C++, as those used for the description of the second and third source codes.

More specifically, the transformation performed by the stub generator 1 generates from the file F1 in which the first code is described a file F4 which contains a stub method description for the server object, a file F5 containing a stub method description for the client object, and an include file F6 which is to be commonly used by objects involved in the object interaction.

In FIG. 1, the file F4 containing the stub method description for the server object is represented by "TestStub.cc" and "TestStub.h". This file F4 will be hereinafter referred to as a "server stub file F4". The "TestStub.h" file is an include file incorporated in the "TestStub.cc" file. The file F5 containing the stub method description for the client object is represented by "TestProxy.cc" and "TestProxy.h". This file F5 will be hereinafter referred to as a "client stub file F5". The "TestProxy.h" file is an include file incorporated in the "TestProxy.cc" file. The include file F6 commonly used by the objects involved in the object interaction is represented by "TestEntry.h" and "TestMsg.h". This file F6 will be referred to as a "common stub file F6". As a result of the described transformation, the source codes contained in the files F4, F5 and F6 are described with C++ as in the cases of the second and third source codes, without using the designator "Active".

Then, compilation is performed on each of the file F2 containing the description of the second source code, the file F3 containing the description of the third source code, and the files F4 to F6 generated by the stub generator 1, and the results of the compilation are linked, thereby forming a server object executable file F7 and a client object executable file F8.

Thus, in the process shown in FIG. 1, the server object executable file F7 is generated by an executable file generating program 2 having a compiler and a linker from the resources which include the file F2 (Test_svc_proc.cc) describing the second source code, the server stub file F4 (TestStub.cc, TestStub.h) containing the stub method description for the server object, and the common stub file F6 (TestEntry.h, TestMsg.h). which is commonly used by the objects taking part in the object interaction.

At the same time, the client object executable file F8 is generated by an executable file generating program 3 having a compiler and a linker from the resources which include the file F3 (Test.cc) describing the third source code, the client stub file F5 (TestProxy.cc, TestProxy.h) containing the stub method description for the client object, and the common stub file F6 (TestEntry.h, TestMsg.h) which is commonly used by the objects taking part in the object interaction.

A detailed description will now be given of the stub generator 1.

The stub generator 1 is designed to generate a stub method very easily and with a high degree of versatility without using any interface definition language, by virtue of the use of the designator "Active".

More specifically, the stub generator 1 is a source code transformation program which is formed by using an object-oriented programming technique, and is intended for generating a stub method to be employed in object interaction. The stub generator 1 performs transformation of source code which describes a stub method with the help of the designator "Active" into source code which describes the stub method in the C++ language without using such a designator. More specifically, in the procedure shown in FIG. 1, the stub generator 1 serves to transform the file F1 (Test.h) describing the stub method with the help of the designator "Active" so as to generate the server stub file F4 (TestStub.h, TestStub.cc), the client stub file F5 (TestProxy.h, TestProxy.cc) and the common stub file F6 (TestEntry.h, TestMsg.h).

Figure 2:
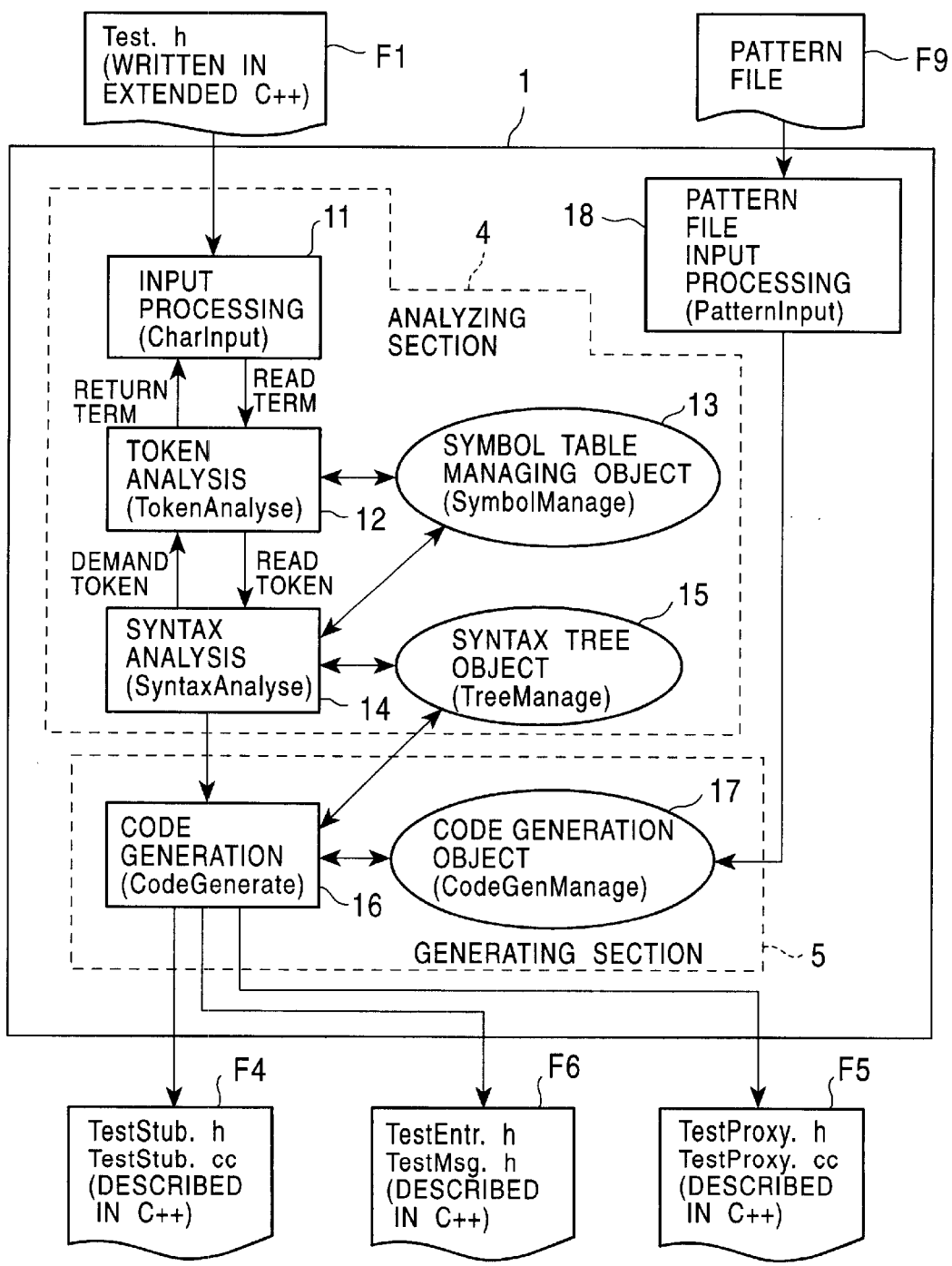
FIG. 2 is a diagram showing a process performed by the stub generator.

As will be seen from FIG. 2, the stub generator 1 is composed mainly of an analyzing section 4 which analyses an input source code, and a generating section 5 which generates a stub method from the analyzed source code. The analyzing section 4 divides the input source code into constituent elements to generate an intermediate expression of the program, while the generating section 5 generates a stub method from the intermediate expression generated by the analyzing section 4.

The configuration of the analyzing section 4 corresponds to the programming language which describes the input source code. Thus, the analyzing section 4 has a different configuration when a different programming language is used for describing the source code input to the stub generator 1. It is to be understood, however, that the analyzing section 4 generates the same intermediate expression regardless of the type of the programming language. A common generating section 5, therefore, can be used for different programming languages used for describing the source code input to the stub generator 1.

FIG. 2 shows, by way of example, the process performed by the stub generator 1. An input processing routine 11 (CharInput) receives the file F1 (Test.h) described with the C++ extended to use the designator "Active". The routine 11 removes null spaces and comments from the input source code, so as to extract meaningful programming terms. In this input processing routine 11, the designator "Active" which is defined by extended C++ is also recognized as a reserved word.

A subsequent routine, i.e., a term analyzing routine (TokenAnalyze) 12, analyzes the terms extracted in the input processing routine 11 and produces a token stream in which meaningful programming terms are arranged according to tokens which are units of logic. This term analyzing routine also recognizes the designator "Active" that is defined by the extended C++.

Figure 3:
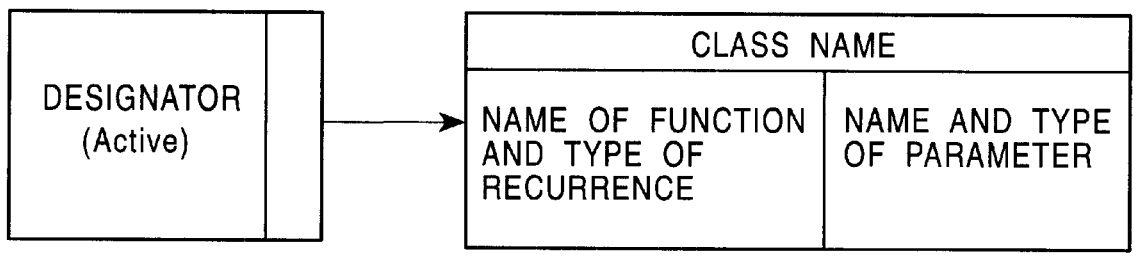
FIG. 3 is an illustration of a class definition conducted in accordance with a designator "Active"
Figure 4:
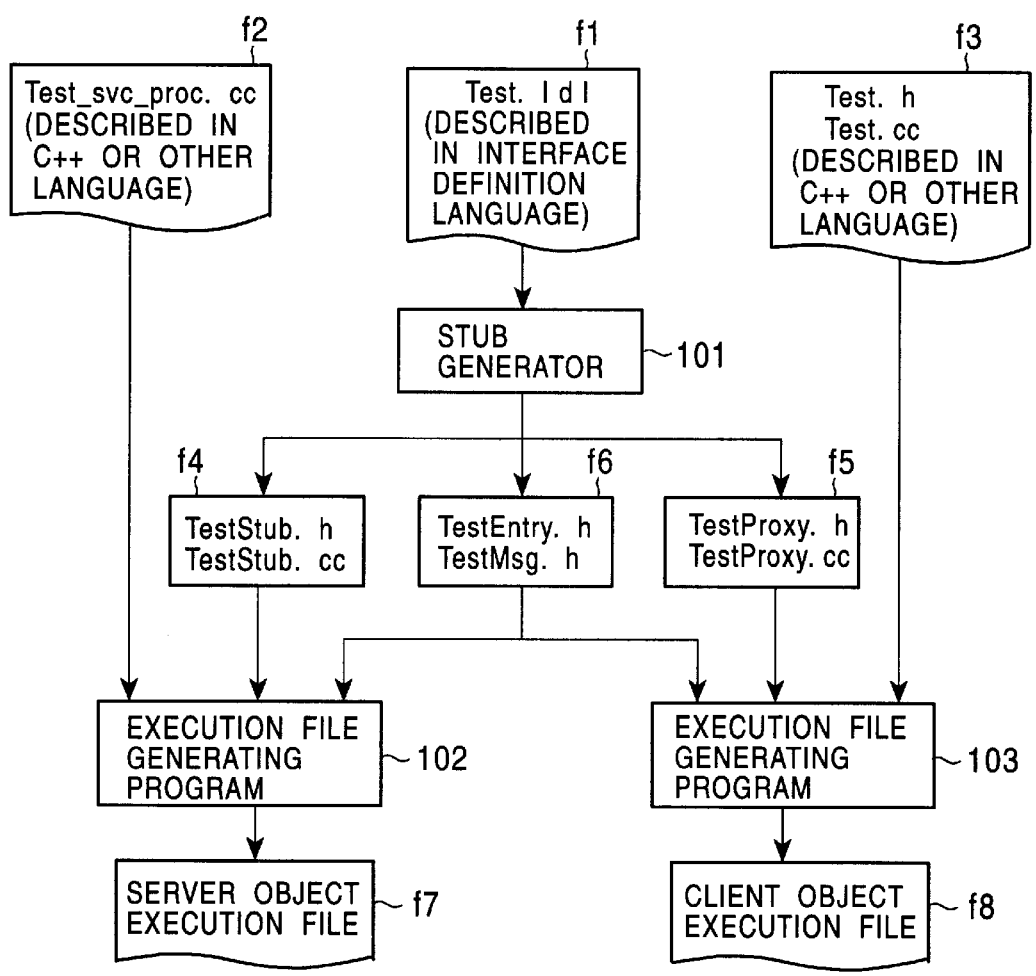
FIG. 4 is an illustration of a conventional procedure for generating a stub method.

The input processing routine 11, as well as the term analyzing routine 12, uses a symbol table managing object (SymbolManage) 13. The symbol table managing object 13 has a data architecture referred to as a "symbol table" which contains information concerning various constituent elements of the program. For instance, the symbol table stores, as shown in FIG. 3, the information concerning the class designated by the designator "Active", including the name of the class and the name of functions contained in the class and their return values, as well as the names of the parameters of the functions and the types of the parameters. Each function may employ two or more parameters. In such a case, information registered in the table contains the names and types of these parameters.

The contents registered in the symbol table managing object 13 are dynamically changeable. That is to say, the contents can be altered as desired, in accordance with the stub method to be generated.

Referring back to FIG. 2, a syntax analysis (SyntaxAnalyse) 14 is then executed to perform a syntax analysis on the token stream produced as a result of the term analyzing routine 12. As a result of this analysis, so-called syntax tree information, indicative of the correlation between the tokens constituting the token stream, is generated and stored in the syntax tree object (TreeManage) 15. The syntax tree information thus obtained constitutes part of the intermediate expression described above.

The input source code is analyzed by the analyzing section 4 in the described manner, whereby an intermediate expression is obtained. Then, the generating section 5 operates to generate the target source code from the intermediate expression produced by the analyzing section 4. More specifically, a code generating routine (CodeGenerate) 16, which is included in the generating section 5 generates and outputs the target source code, based on the syntax tree information obtained as the result of the analysis performed by the syntax analyzing routine 14. More specifically, the code generating routine 16 calls a code generating object (CodeGenManage) 17. The code generating object 17 includes a method for generating the target source code from the intermediate expression obtained through the analysis performed by the analyzing section 4. Thus, the target source code is generated by the code generating object 17.

More specifically, the code generating object 17 generates and outputs the server stub file F4 (TestStub.h, TestStub.cc), the client stub file F5 (TestProxy.h, TestProxy.cc) and the common stub file F6 (TestEntry.h, TestMsg.h). These files F4, F5 and F6 have been described in C++, without the use of the designator "Active".

The stub generator 1 is configured so as to register predetermined pattern files F9 in the code generating object 17. These pattern files F9 are switchable so that stub methods corresponding to different program executing environments are generated, as will be understood from the following description.

In general, an application program is executed under a predetermined program executing environment which is provided by the operating system. There are a variety of program executing environments.

An operating system "Aperios" (registered trademark), for example, is designed to simultaneously provide a plurality of different program executing environments. Each of the program executing environments is referred to as a "meta space". More specifically, the operating system "Aperios" can simultaneously provide a meta space referred to as an "mAV meta space" and a meta space referred to as an "mCOOP meta space". The mAV meta space is for executing so-called procedural programs. An application program to be executed on the mAV meta space is described as a single object. On the other hand, the mCOOP meta space is used for object-oriented programs. In general, an application program to be executed on the meta space is constituted by a plurality of objects.

When the operating system "Aperios" is loaded on a device having a television (TV) function, the arrangement may be such that an application program for displaying moving images on the television is executed in the mAV meta space, while an application program, which implements a graphical user interface (GUI) for controlling an operation panel through which operation instructions are input to the device, is executed on the mCOOP meta space. The stub method employed in the application program executed on the mAV meta space is different from the stub method employed by the application program executed on the mCOOP meta space.

It is necessary that the stub method generated by the stub generator 1 suits the program execution environment on which the stub method is to be executed. More specifically, the stub method of the application program to be executed on the mAV space has to correctly function on the mAV meta space. Similarly, the stub method of the application program to be executed on the mCOOP meta space has to correctly function on the mCOOP meta space.

In the stub generator 1 used in the described embodiment, therefore, pattern files F9 corresponding to a plurality of different program execution environments can be registered in the code generating object 17, in order to make it possible to generate stub methods for a plurality of different program execution environments. In other words, pattern files F9 corresponding to the respective program execution environments are registered in the code generating object 17 for selective use in accordance with the program execution environment on which the desired stub method is to be executed, whereby the stub method is generated in accordance with each of a plurality of different program execution environments.

More specifically, referring to FIG. 2, pattern files F9 describing information necessary for generating stub methods corresponding to the program execution environments are formed and registered in the stub generator 1, prior to the generation of a stub method. Upon receipt of the pattern files F9, the stub generator 1 activates a pattern file input processing routine (PatternInput) 18 which accepts these pattern files F9 and registers the accepted pattern files F9 as internal information in the code generating object 17. It is to be noted that the registration of the pattern files F9 in the code generating object 17 is conducted with clear indication of the relations between the pattern files and the program execution environments, i.e., to which one of the program execution environments each pattern file corresponds.

The stub generator 1, when generating a stub method, makes a reference to one of the pattern files F9 that corresponds to the program execution environment on which the stub method to be generated is executed. Thus, a single stub generator 1 can generate stub methods corresponding to a plurality of different program execution environments.

It is also to be understood that the registration of the pattern files F9 for different program execution environments enables the stub generator 1 to dynamically alter the procedure for generating the stub method. For instance, when it is desired to generate a stub method corresponding to a new program execution environment, a pattern file F9 corresponding to the new program execution environment is input to the stub generator 1, so that the stub generator 1 generates a stub method corresponding to the new program execution environment. Similarly, when an existing program execution environment has been updated, the pattern file F9 corresponding to this program execution environment is modified correspondingly and registered in place of the existing pattern file F9. Consequently, the stub method is generated for the updated program execution environment.

The source code inputted to the stub generator 1 is described by using the designator "Active" in a format which is common to different program execution environments, i.e., with no dependency on the program execution environment on which the stub method to be generated is executed. Thus, the contents described in each pattern file F9 include the information which is necessary for transforming the source code described in the format common to a plurality of different program execution environments into another source code corresponding to a selected program execution environment.

Thus, the stub generator 1 used in this embodiment transforms, by referring to the registered pattern file F9, the source code containing information of a stub method described in a format common to a plurality of different program execution environments into another source code of a predetermined format corresponding to the program execution environment on which the stub method is to be executed.

As will be understood from the foregoing description, the present invention makes it possible to generate a stub method without the use of an interface definition language, by virtue of the use of the stub generator 1. This eliminates the necessity for the studying and learning of interface definition language which otherwise are necessary for when those who are not familiar with interface definition languages attempt to form an application program that uses a stub method. Thus, the present invention greatly facilitates formation of an application program that uses a stub method.

The stub generator 1 employed in the described embodiment, which enables generation of a stub method without the help of an interface definition language as stated above, provides another advantage in that it eliminates the problem encountered by the known art in regard to the difficulty in confirming coincidence between the interface presented by the portion described in an interface definition language and the interface of the portion described in a programming language such as C++. Thus, still another advantage offered by the use of this stub generator 1 is that the work performed by the stub method in regard to confirmation of the object interaction interface is greatly facilitated.

A further advantage is that, since a reference is made to a registered pattern file F9 corresponding to the program execution environment on which the stub method is to be executed, the transformation of the source code can be conducted by using a single stub generator 1 commonly for a plurality of different program execution environments.

A further advantage is that the stub generator 1 permits dynamic alteration of the stub method generating procedure, by virtue of the feature of registering a pattern file F9 corresponding to each of a plurality of different program execution environments. Therefore, the stub generator 1 can generate, by altering the contents of a pattern file F9, a stub method which was not contemplated in the initial design of the stub generator 1.

As will be understood from the foregoing description, the present invention provides a source code transformation process which enables generation of a stub method with high degrees of ease and versatility, as well as wide adaptability to a variety of program execution environments, without using any interface definition language.

Although the invention has been described through its preferred form, it is to be understood that the described embodiment is only illustrative. For instance although the C++ has been specifically mentioned as the programming language which describes the source code, the present invention can equally be carried equally well by using another programming language. Further changes and modifications may be imparted thereto without departing from the scope of the present invention which is limited solely by the appended claims.

What is claimed is:

1. A source code transformation process, comprising the steps of:

inputting, as a first file, primary source code described with a first programming language which is both a non-interface-definition language and an extended version of a second programming language, said source code containing information concerning a stub method to be used in an object interaction, said information being described in a format which is common to a plurality of different program execution environments;

inputting a server object information source code as a second file containing a portion of server object information other than object interaction information described in said primary source code;

inputting a client object information source code as a third file containing a portion of client object information other than object interaction information described in said primary source code;

transforming, by referring to registered information corresponding to the program execution environment on which said method is to be executed, said primary source code into a secondary source code described with the second programming language in a predetermined format corresponding to the program execution environment on which said method is to be executed, wherein said transformation generates a fourth file which contains a stub method description for a server object, a fifth file containing a stub method description for a client object, and an include file which is to be commonly used by objects involved in the object interaction; and compiling said second, third, fourth, fifth and include files, and linking the results of said compilations, to thereby form a server object executable file and a client object executable file.

2. The source code transformation process of claim 1, wherein each of said program execution environments is a respective type of meta space.

3. The source code transformation process of claim 1, wherein said plurality of different program execution environments include a first meta space for executing procedural programs and a second meta space used for object-oriented programs.

4. The source code transformation process of claim 1, wherein said first programming language is extended C++ and said second programming language is C++.

5. A computer-readable recording medium, storing a source code transformation program that implements a process comprising the steps of:

inputting, as a first file, primary source code described with a first programming language which is both a non-interface-definition language and an extended version of a second programming language, said source code containing information concerning a stub method to be used in an object interaction, said information being described in a format which is common to a plurality of different program execution environments;

inputting a server object information source code as a second file containing a portion of server object information other than object interaction information described in said primary source code;

inputting a client object information source code as a third file containing a portion of client object information other than object interaction information described in said primary source code;

transforming, by referring to registered information corresponding to the program execution environment on which said method is to be executed, said primary source code into a secondary source code described with the second programming language in a predetermined format corresponding to the program execution environment on which said method is to be executed, wherein said transformation generates a fourth file which contains a stub method description for a server object, a fifth file containing a stub method description for a client object, and an include file which is to be commonly used by objects involved in the object interaction; and compiling said second, third, fourth, fifth and include files, and linking the results of said compilations, to thereby form a server object executable file and a client object executable file.

6. The recording medium of claim 5, wherein each of said program execution environments is a respective type of meta space.

7. The recording medium of claim 5, wherein said plurality of different program execution environments include a first meta space for executing procedural programs and a second meta space used for object-oriented programs.

8. The recording medium of claim 5, wherein said first programming language is extended C++ and said second programming language is C++.

9. A computer-readable recording medium, storing a program that implements a source code transformation process for generating stub methods used in object interactions, said process comprising the steps of:

receiving, by a stub generator, a plurality of pattern files each corresponding to one of a plurality of program execution environments including at least a first meta space for executing procedural programs and a second meta space for executing object oriented programs;

registering said pattern files as internal information of said stub generator;

inputting a primary source code described with a first programming language which is an extended version of a second programming language, said first and second programming languages each being non-interface-definition languages, said source code containing information concerning a stub method to be used in an object interaction, and said information being described in a format which is common to a plurality of different program execution environments; and transforming, by said stub generator referring to one of said registered pattern files corresponding to the program execution environment on which said stub method is to be executed, said primary source code into a secondary source code described with the second programming language in a predetermined format corresponding to the program execution environment on which said stub method is to be executed;

whereby said stub generator generates a plurality of stub methods corresponding to a plurality of program execution environments, respectively.

10. A source code transformation process for generating stub methods used in object interactions, comprising the steps of:

receiving, by a stub generator, a plurality of pattern files each corresponding to one of a plurality of program execution environments including at least a first meta space for executing procedural programs and a second meta space for executing object oriented programs;

registering said pattern files as internal information of said stub generator;

inputting a primary source code described with a first programming language which is an extended version of a second programming language, said first and second programming languages each being non-interface-definition languages, said source code containing information concerning a stub method to be used in an object interaction, and said information being described in a format which is common to a plurality of different program execution environments; and transforming, by said stub generator referring to one of said registered pattern files corresponding to the program execution environment on which said stub method is to be executed, said primary source code into a secondary source code described with the second programming language in a predetermined format corresponding to the program execution environment on which said stub method is to be executed;

whereby said stub generator generates a plurality of stub methods corresponding to a plurality of program execution environments, respectively.

11. The source code transformation process of claim 10, wherein said first programming language is extended C++ and said second programming language is C++.

12. The source code transformation process of claim 10 wherein said transformation generates a fourth file which contains a stub method description for a server object, a fifth file containing a stub method description for a client object, and an include file which is to be commonly used by objects involved in the object interaction, and said process further comprising the steps of:

inputting a server object information source code as a second file containing a portion of server object information other than object interaction information described in said primary source code;

inputting a client object information source code as a third file containing a portion of client object information other than object interaction information described in said primary source code;

compiling said second, third, fourth, fifth and include files, and linking the results of said compilations, to thereby form a server object executable file and a client object executable file.

* * * * *